United States Patent [19]

Crasto et al.

[11] 4,153,451
[45] May 8, 1979

[54] LEAD RECOVERY AND WASTE DISPOSAL PROCESS

[75] Inventors: Lloyd T. Crasto; Robert H. Jones; John C. Klock, all of Baton Rouge, La.

[73] Assignee: Ethyl Corporation, Richmond, Va.

[21] Appl. No.: 901,453

[22] Filed: May 1, 1978

[51] Int. Cl.$^2$ .............................................. C22B 13/00
[52] U.S. Cl. ............................................ 75/77; 75/24
[58] Field of Search ........................................ 75/24, 77

[56] References Cited

U.S. PATENT DOCUMENTS

| 2,073,631 | 3/1937 | Gilbert | 204/21 |
|---|---|---|---|
| 2,194,441 | 3/1940 | Gilbert | 75/78 |
| 2,689,791 | 9/1954 | Boag | 75/66 |
| 2,691,575 | 10/1954 | Larson | 75/77 |
| 2,692,197 | 10/1954 | Denison | 75/78 |
| 2,759,896 | 8/1956 | Hawkes et al. | 252/303 |
| 2,765,328 | 10/1956 | Padgitt | 260/437 |
| 2,829,093 | 4/1958 | Blaskett | 204/66 |
| 2,843,476 | 7/1958 | Hoffmann | 75/78 |
| 2,853,378 | 9/1958 | Mattison et al. | 75/78 |
| 2,899,296 | 8/1959 | Kreimeier | 75/77 |
| 3,052,535 | 9/1962 | Peters | 75/77 |
| 3,188,199 | 6/1965 | Mattison et al. | 75/77 |

FOREIGN PATENT DOCUMENTS 836447  3/1970  Canada.

*Primary Examiner*—M. J. Andrews
*Attorney, Agent, or Firm*—Donald L. Johnson; John F. Sieberth; James M. Pelton

[57] ABSTRACT

A process for the recovery of lead from lead by-product materials, including lead-containing slag and other lead-containing waste materials, in a rotary smelting furnace using an active alkali metal mixture by-product as a reductant and flux.

8 Claims, No Drawings

LEAD RECOVERY AND WASTE DISPOSAL PROCESS

BACKGROUND OF THE INVENTION

This invention relates to a process for recovering metallic lead from lead by-product materials of the character of those produced in the manufacture of tetraalkyllead compounds, such as tetraethyllead.

Tetraethyllead has been manufactured commercially for many years by reacting an excess of ethyl chloride with lead-monosodium alloy. In such reaction, the sodium in the alloy is mostly converted to sodium chloride, about 25% of the lead in the alloy is converted to tetraethyllead, and most of the rest of the lead in the alloy is converted to metallic lead in finely divided form. After the reaction has been completed, the excess ethyl chloride is distilled off, and the reaction mass is then drowned in water and the tetraethyllead removed by steam distillation in the presence of a still aid which largely prevents agglomeration of the finely-divided metallic lead particles. The steam still residue comprises a suspension of the by-product lead particles in a dilute solution of sodium chloride. This suspension is conveyed to a sludge pit where it is allowed to settle, forming an upper layer of aqueous salt solution and a lower layer of wet sludge which is composed mainly of the finely-divided lead mixed with about 8% to about 20% by weight of the aqueous salt solution. The water layer is drawn off, the wet sludge is washed with water to remove most of the salt and then the sludge is dried to remove most of the water.

The resulting dried by-product lead sludge is impure, containing sodium chloride, lead chloride, sodium hydroxide and, in some cases, lead sulfate, lead sulfide and lead chromate (formed by reaction of the lead with the still aid), usually in a proportion of less than 1% by weight. In addition, the lead particles are coated with lead oxide. Usually, the lead oxide is present in a proportion of from about 2% to about 10% by weight, frequently as high as about 20% and, in extreme cases, as high as about 30%. It is possible, in some cases, to keep the amount of lead oxide down to 0.1-0.2% by weight. The by-product lead sludge will sometimes contain iron salts, such as ferric chloride, ferric sulfate and iron sulfides, when an iron compound (usually ferrous sulfate) is employed as an ingredient of the still aid. By-product lead sludge of the above character is also produced in the production of other lead alkyls by similar reactions and in the production of tetraethyllead and like lead alkyls by other reactions.

The recovery of the lead in refined form from such impure by-product lead sludge has been difficult and has required a series of treatments which are inconvenient and costly. Usually, the impure by-products lead sludge has been refined by melting it in a reverberatory furnace at a temperature of from about 700° C. to about 900° C. to form an upper layer of slag and a lower layer of molten lead consisting of most of the metallic lead originally present in the impure by-product lead sludge. A temperature of at least 700° C. is required in the furnace to release molten metallic lead therefrom. The lower layer of molten lead is drawn off into a pump pot, a dross usually being formed during the pot filling and being recovered as skimmings, and returned to the alloying operation. The slag and the dross are then further treated to recover their lead content.

The slag material is composed mainly of lead oxide, occluded lead, sodium chloride and minor proportions of other metal compounds such as lead chloride, sodium hydroxide, sodium carbonate, sodium plumbite, and ash residue and, sometimes, minor proportions of sodium sulfide, sodium dichromate, lead sulfide and iron salts. Such slag material is normally in the form of a high melting, highly viscous, pasty or solid mass which holds a material amount of metallic lead dispersed therein, the metal compounds therein preventing the dispersed molten lead particles from coalescing and passing into the lower layer of molten lead. When the impure by-product lead steam still sludge contains iron or iron compounds, they also appear in the reverberatory furnace slag, tending to concentrate as solid particles at the interface of the slag and the molten lead layers, interfering with the efficiency of contact between those layers and the passage of the molten lead from the slag layer into the molten lead layer. Heretofore, such slag materials have been shipped to another plant for reclamation of their lead content, usually by treatment with iron oxide, calcium carbonate and coke at high temperatures in a blast furnace. However, other methods for lead recovery at various stages are known.

Denison, in U.S. Pat. No. 2,692,197, teaches a method of refining the impure by-product lead sludge by treating it with molten sodium hydroxide to form a lower layer of molten metallic lead and an upper layer of molten caustic containing the slag materials. The resulting mixture of caustic and slag materials must be further treated to recover the lead therefrom.

Larson, in U.S. Pat. No. 2,691,575, teaches the treatment of lead oxide slag materials with fused sodium hydroxide and metallic sodium to reduce the lead oxide to metallic lead. While effective, such a process, and the process of Denison, supra, have the disadvantage that they cannot be operated practically in the existing conventional reverberatory furnaces because the fused caustic, particularly in the large amounts employed, severely and rapidly attacks the ceramic linings of the furnaces. The replacing of such linings with suitable alkali resistant material is costly. Also, such processes require the use of considerable amounts of sodium hydroxide which are difficult to recover. Furthermore, in the process of Larson, it is difficult to convert all of the lead compounds to metallic lead.

Kreimeier in U.S. Pat. No. 2,899,296 teaches the treatment of lead by-product materials, such as reverberatory furnace slag, at a temperature of 400°–850° C. in the presence of a compound selected from sodium cyanide, potassium cyanide, mixtures of sodium cyanide and potassium cyanide, and mixtures of any of those with a hydroxide or the corresponding alkali metal, such that the alkali metal cyanide is present in proportion of about 20% excess over that theoretically required to react with the lead compounds and convert them to metallic lead. Although this process appears to be simpler in that only one step is required, it nevertheless suffers from the disadvantage of introducing cyanide compounds into the slag removed from the furnace and, thus, presents an additional waste disposal problem.

Padgitt in U.S. Pat. No. 2,765,328 teaches that the presence of a small amount of unreacted sodium metal from the tetraalkyllead reaction during smelting of by-product lead sludge in the lead recovery reverberatory furnace assures that the lead is collected as a homogeneous liquid phase virtually free of metal chloride originally present. The unreacted sodium metal comes from the sodium lead alloy used in the alkylation reaction. Thus, a lower yield provides unreacted sodium metal which is used to attain the advantageous smelting process result of lowering the sodium chloride content in the smelted lead and decreasing the smelting time. Although this process provides extremely efficient smelting operations, the lowered yield in production of tetraalkylled compounds is undesirable.

Another waste product produced in the manufacture of tetraalkyllead is an alkali metal in admixture with an alkaline earth metal, specifically, sodium metal mixed with calcium metal and their salts. Sodium is used as described above in an alloy with lead in the manufacture of tetraalkyllead. Sodium for alloying with lead is produced in one method by an electrolytic process, utilizing as the electrolyte a fused metal salt mixture. For example, in the production of sodium a fused mixture of sodium chloride and calcium chloride is employed as the electrolyte. The purpose of adding the calcium chloride is to reduce the melting point of the electrolyte to a temperature below the boiling point of sodium. Optionally, the fused salt bath can also contain barium chloride. In this way, the sodium produced at the cathode will be in the molten state and will not be vaporized at the temperature of the electrolytic mixture. While the use of the fluxing agent such as calcium chloride has this advantage, it does introduce additional difficulties into the overall process. The main difficulty is that calcium metal is produced at the cathode along with the sodium. This crude product is collected, cooled and subsequently filtered so as to recover most of the sodium in substantially pure form for use in alloying with lead. The residue or filter sludge which remains after this purification contains appreciable quantities of both sodium and calcium and it is the production of this sludge as a by-product which has presented a disposal problem to the industry for a number of years.

This sludge contains on the average about 90–95 weight percent sodium and calcium, the remainder consisting of the various salts and oxides of these metals and other impurities. The sodium content averages about 70 percent by weight and the calcium content varies between 5 and 30 percent. The sludge is in the form of crystals of calcium metal and electrolyte embedded in a matrix of sodium.

It is necessary to either convert this sludge into a usable commercial product or dispose of the material in some suitable manner. Although workable processes have been described for converting the sludge into useful products (note, for example, U.S. Pat. No. 2,759,896 and Canadian Pat. No. 836,447), these processes are not used commercially because of the costs and hazards associated with handling and processing the large volumes of sodium filter sludge produced in commercial facilities.

Accordingly, the disposal of such sludge is still the only practical and feasible alternative. One such disposal method presently in use is to collect the active sodium/calcium filter sludge in 55-gallon drums, transport the drums to a suitable ocean dumping site, perforate the drums and toss them overboard. The contact between the active metal in the sludge and the water is vigorous, but harmlessly converts the filter sludge to oxidation products of no real danger. This method is costly and involves transporting the sludge over considerable distances. A significant contribution to the art would be a safe, convenient, economical, controllable, complete and environmentally acceptable process or method for disposing of this sludge. Such a process or method is provided as one aspect of this invention.

Thus, this invention provides for recovery of by-product lead from reverberatory furnace lead slag and the use of waste sodium/calcium filter sludge as the major reductant in the process. Accordingly, the present invention provides many advantageous aspects which are illustratively described hereinbelow.

THE INVENTION

As indicated hereinabove, the present invention relates to a process for the recovery of lead from lead by-product materials which contain from 45 to about 75 weight percent lead in the form of lead compounds which are of the character of slag produced in a reverberatory lead recovery furnace, comprising the steps of (a) charging said lead by-product materials to a rotary furnace; (b) drying and melting the lead-containing materials at 330 to about 650° C. until any residual moisture is driven off; (c) adding to the molten furnace charge about 0.05 to about 0.25 pounds per pound of said charge of an active alkali metal mixture; (d) smelting the furnace charge in the presence of said alkali metal mixture for a time sufficient to form a separate metallic lead phase and a residue; and (e) removing the metallic lead from the furnace.

The materials which are useful for treating in the process of the present invention are lead-containing materials which are generally considered to be by-product materials that contain lead in the form of lead compounds and are generally of the character of slag produced in a reverberatory recovery furnace useful in the recovery of lead from the manufacture of tetraalkyllead compounds. Typically, analysis of reverberatory furnace slag can have the following ranges:

| Component | Range of Reverberatory Furnace Slag, Weight % |
|---|---|
| Total Lead | 50–88 |
| PbO | 0–50 |
| PbS | 0–25 |
| PbSO$_4$ | 0–25 |
| Pb (metallic) | 0–20 |
| NaCl | $\geq 2$ |

However, the analysis will vary depending upon reverberatory furnace operation and feed.

In addition, other lead-containing waste materials are also useful as feed to the rotary furnace employed in the process of this invention. For example, in many instances the sludge from manufacture of tetraalkyllead and the slag from the reverberatory lead recovery furnaces are separately leached to remove metal salts. Generally, this leaching is done with caustic and with water. The aqueous effluent from these leach steps contains considerable quantities of soluble and finely-divided, suspended lead compounds which are best removed before release of the water into the environment. Thus, additional treatment, filtration, sedimentation and removal steps are taken to separate the finely-divided, suspended lead-containing solids from the aqueous streams. Additionally, the reverberatory lead furnace flue gases contain solids which are undesirable for introduction into the atmosphere. Many of these contain lead. One practice is to recover these materials in a venturi scrubber in which water is used to scrub out the majority of the entrained solids from the flue gases.

These materials are also subsequently separated from the aqueous stream. Thus, in addition to slag, which contains from about 50 to 88 weight percent of lead, the solids removed from aqueous process water treatment streams, such as settling basin solids, dredged pond spoils or dewatering sand bed solids are also waste materials which can be additionally treated to recover the lead content therein. Such materials have typical analysis as follows:

| Component | Settling Pond Solids | Dredged Pond Spoils | Settling Basin Solids |
|---|---|---|---|
| TEL | 9–11.1 | 7 | 0.8–3.0 |
| PbO | Trace–36.6 | 22 | — |
| PbS | 3.3–5.3 | 13 | 5.2–0 |
| $PbSO_3$ | 0–4 | 30 | — |
| $Pb_3(CO_3)_2(OH)_2$ | 11.6–32 | 16 | — |
| Total Inorganic Lead | — | — | 51.8–57.9 |
| Unidentified | 14–56.2 | 12 | 41.6–45.4 |

These materials, in addition to the slag, generally contain from 50 to about 60 weight percent lead in the form of lead compounds and free lead. Disposal of such materials is not economically attractive but nevertheless represents an economic loss which the process of the present invention can substantially curtail.

The waste lead-containing materials are treated with a waste alkali metal containing an alkaline earth metal and salts of both in admixture. Such materials are preferably of the character of sodium filter sludge from the electrolytic production of sodium employing a fused salt electrolyte. As such, the sodium filter sludge contains from 70 to 95 weight percent of active sodium with from 5 to 30 weight percent being calcium, salts or a mixture of both. These materials are of the character of sodium filter sludge produced as a by-product of sodium manufacture. Their use in the present process provides an economic and technical alternative to disposal as waste.

Treatment of the above materials, according to the process of this invention, is carried out in a rotary furnace. In general, rotary furnaces are known in the metal treating art. However, it is believed that they have not been applied to lead smelting for recovery of lead by-product materials from lead reverberatory furnace slag and waste lead-containing solids. Conventionally, rotary furnaces are cylindrical horizontal, brick-lined, steel shells which can vary in diameter and length. The furnace is mounted on rollers and rotates during the smelting, operating in the same manner as a rotary kiln. The furnace is charged and fired at one end and flue gases exit from the other end of the furnace into a flue stack where they are collected and treated to remove entrained solids, e.g., in scrubbers. After smelting is completed, the product lead is tapped from the furnace, followed by tapping of the liquid residue.

The feed end of the rotary furnace has a hinged circular door which contains the burners and an opening for feeding the active alkali metal mixture. The charging door is hinged so that it can be swung out of the way and the lead slag and lead-containing waste material can be conveniently charged to the furnace. On completion of feeding the lead charge, the door is swung back into a closed position, the burner ignited and the drying and melting operation begun. The door opening for adding the active alkali metal mixture may contain a chute with a slide plate cover to close off the opening after adding the sodium filter sludge during smelting. The drive mechanism for rotating the furnace is adapted to rotate the furnace at any desired rate. Generally, a conventional electric motor and suitable reducing gears are used to power dual drive rollers on a single trunnion ring circumferentially about the furnace. The speed of rotation is generally from one to about two revolutions per minute. The interior of the furnace shell is usually covered with an asbestos lining upon which is a layer of ceramic insulation fire brick such as mullite, magnesite or any similar type of insulation brick, followed by a layer of working brick which is in contact with the molten metal and residue. The type of brick, either insulation or working brick, should be those known to withstand the molten metal and residue and should be alkali resistant since the brick will be contacted by various forms of alkali metal in both the free and combined state.

In general, the burner door is opened, the tapping spout is closed with fire clay, and the charge is either manually or automatically fed to the furnace. The burner door is then closed, the burner(s) ignited and allowed to burn while the furnace rotates until the charge is completely melted and any residual moisture from the settling pond solids (which may be 50 weight percent water) or leached slag is driven off. When the temperature sensor has attained a predetermined working temperature, for instance about 980° C., for a period sufficient to insure that all the moisture has been removed. The active alkali metal mixture, such as sodium filter sludge, is charged to the furnace and the furnace is maintained at the smelting temperature for a period sufficient to allow complete reaction of the alkali metal with the lead compounds whereby a lead phase is produced and a residue or slag phase is produced. Generally, the heavier lead phase will lie on the bottom of the charge, but because of the furnace rotation continuous mixing occurs between the slag and the metallic lead. The entire cycle can take from 3–5 hours and, typically, preferred cycles last about 4 hours.

A typical process for recovery of by-product lead in the rotary furnace according to this invention is described as follows. The operator will charge both lead recovery reverberatory furnace slag and settling basin solids or spoils pond solids, or both, to the furnace. When the correct volume of material is charged, the furnace door will be closed and the burner ignited. The entire feed period should be 15 minutes and the furnace should be rotating at about 1.3 to 1.4 rpm. The burner is controlled by a temperature sensor in the exhaust gas stack at 1800° F. (about 982° C.). When the temperature has been stable at this level for about 10 minutes, the addition of the sodium/calcium sludge will begin. About 0.05 to about 0.25 pounds per pound of lead-containing waste materials will be added through the chute on the burner door over a period of 75 minutes. At the end of sludge addition, soda ash may be added to provide additional fluxing. Smelting will then take place for the next 60 minutes at 900°–1000° C., then the furnace rotation will be stopped with the tapping spout in front of the furnace above the liquid level. The operator will detach the cover plate over the tapping spout and replace it with a cover plate having a small hole in the center, for example, a one-inch hole. The tapping spout is filled with fire clay at the beginning of each charge and will be drilled through using suitable equipment, such as an air hammer. Caution must be exercised during this step and protective clothing worn by the operators. The lead molds or launder pots are then placed in position and the furnace rotated so that the tapping spout is directly above the pot. Lead will flow into the molds and be solidified or into a launder pot and then down the run line and finally into a pump pot from which it is directed to the alloying plant to be alloyed with fresh amounts of sodium and fresh lead for producing monosodium lead alloy for the manufacture of tetraalkyllead compounds. After the lead has been tapped, the furnace will be rotated back above the liquid level, the cover plate with the one inch diameter hole removed and the remainder of the fire clay drilled out of the tapping cone in the furnace. A residue launder pot will then be placed in position and the furnace rotated until the tapping spout is directly above the pot. The residue or slag will flow into the residue pot and then into residue molds. A larger hole is necessary for the residue because it is more viscous than molten lead and, for this reason, does not flow through the one inch diameter hole. The burner is on during the entire tapping period. After removal of the residue, the furnace is rotated up and the tapping spout filled with fire clay and the furnace is ready for the next charge.

In order to more clearly illustrate the invention, the following examples describe suitable methods of carrying out the invention and the advantageous results obtained thereby.

EXAMPLE 1

Several runs were made following the procedure given below. The results are shown in the accompanying table. About 6500 pounds of wet slag, analyzing 55% Pb, from a lead recovery reverberatory furnace was charged to a rotary furnace while rotating at 1.5 rpm. The burner was ignited and held at about 980° C. for 30 minutes to dry the slag. After drying the slag 315 pounds of sodium filter sludge was added to the furnace. This was allowed to melt and react for 30 minutes, followed by another 225 pounds and after another 30 minute period a third amount of 225 pounds of sodium sludge was fed. The furnace charge was allowed to smelt for 90 minutes. The lead was then tapped, followed by tapping the residue.

The yield of lead from the furnace can be determined on the basis of material charged or lead recovered. Based on the feed analysis, yields averaging 100 percent recovery of lead were obtained. However, the yield based on recovered lead was 95%. This latter method should be more accurate because of the accuracy of the weighing and analysis of the separated product lead and residue.

The results of several runs following the above procedure are given in the following table. Problems of start-up and furnace temperature control prevented charge 1 from being representative. However, the data are included in the overall efficiency calculations.

| | | Material In | | |
|---|---|---|---|---|
| Charge No. | Slag Fed to Furnace (lbs) | Pb In* Slag Fed (lbs) | Pb Recovered (lbs) | Yield % |
| 1 | 4,200 | 2,310 | 1,510 | 65 |
| 2 | 6,500 | 3,575 | 3,430 | 96 |
| 3 | 6,500 | 3,575 | 4,430 | 124 |
| 4 | 6,500 | 3,575 | 3,495 | 98 |
| 5 | 6,500 | 3,575 | 3,700 | 103 |
| Total | 30,200 | 16,610 | 16,565 | 100 |

| | | Material Out | | | |
|---|---|---|---|---|---|
| Charge No. | Residue (lbs) | Pb in Residue % | Pb in Residue (lbs) | Pb Recovered (lbs) | Total Pb (lbs) | Yield % |
| 1 | 1,870 | 13.0 | 243 | 1,510 | 1,753 | 86 |
| 2 | 2,445 | 5.4 | 132 | 3,430 | 3,562 | 96 |
| 3 | Not Weighed | 4.3 | — | — | — | — |
| 4 | 2,875 | 10.0 | 288 | 3,495 | 3,783 | 92 |
| 5 | 2,450 | 1.1 | 27 | 3,700 | 3,727 | 99 |
| Total | 9,640 | | 690 | 12,135 | 12,925 | 95 |

*Based on analysis of sample taken from several locations in slag pile - 55% Pb.

Approximately 1 weight percent soda ash was added to the third and fourth charges to determine if a yield improvement could be achieved or if the residue viscosity could be reduced. Although there appears to be no yield improvement, the residue did evidence a slight decrease in viscosity as judged from the residue tapping operation.

EXAMPLE 2

In an experiment similar to Example 1, lead recovery reverberatory furnace slag and settling pond solids were smelted in the presence of sodium filter sludge. The results of these runs are given in the Table below. Primarily, the difference in this experiment and the foregoing one was the inclusion of lead-containing sludge from settling ponds, fed with effluent from water treatment facilities associated with alkyllead manufacture. These sludge solids have a typical analysis as follows:

| Component | Weight Percent (Water-free Basis) |
|---|---|
| Tetraethyllead | 7 |
| Lead Oxide | 22 |
| Lead Sulfide | 13 |
| Lead Sulfite | 30 |
| Basic Lead Carbonate | 16 |
| Aluminum Hydroxide | 0.04 |
| Unknown | 10 |
| Total | 100 |

The total of inorganic lead in the sample was 67.7 weight % The water-treatment or settling pond solids sludge made up about 30 weight percent of the total charge to the furnace, on a dry basis. In other aspects, the procedure, furnace operating conditions and cycle time is about the same except that the drying period is longer because of the greater amount of water included in the settling pond solids. The following material balance resulted from the runs made in this experiment.

| Charge No. | Slag Fed (lbs) | Spoils Fed (lbs) | Total* Pb Fed (lbs) | Total Pb Recovered (lbs) | Yield % |
|---|---|---|---|---|---|
| 1 | 4,600 | 1,625 | 3,388 | 3,340 | 98.6 |
| 2 | 4,000 | 2,275 | 3,084 | 4,130 | 133.9 |
| 3 | 3,700 | 2,600 | 2,932 | 2,500 | 85.3 |
| 4 | ~3,000** | 3,250 | ~2,560 | 2,270 | ~70 |
| 5 | 0 | 6,825 | 1,092 | 730 | 66.8 |
| Total | 15,300 | 16,575 | 13,056 | 12,970 | 99.3≠ |

*Based on average analysis for slag and one spot sample for spoils ponds solids.
**Estimated — scales broken.
≠Calculated yield from totals, not average yield.

The above results vary greatly because of the feed analysis; however, the calculated yield of 99.3% is quite representative and if the correct weights of charge 4 were known would probably be higher. This experiment was undertaken with the goal of qualitatively determining whether the addition of dredged sludge from settling ponds would have any gross effects on the operation of the furnace or on lead recoveries. None were noted.

Although other lead recovery processes are known, it is believed that the present process uniquely employs waste materials heretofore having no further captive use, presenting a disposal problem and having a negative value (an expense to get rid of), but which now are valuable feed materials for recovery and recycle of essential raw materials, which save capital, both from elimination of disposal costs and decrease in purchased raw materials required.

Having illustrated the present process, it is desired that the foregoing disclosure be considered non-limiting of the scope of the process of the invention. Thus, many variations and changes within the scope of the invention will be apparent to skilled practioners after reading the foregoing specification. Therefore, it is desired that the present invention be limited only by the lawful scope of the following claims.

What is claimed is:

1. A process for the recovery of lead from lead by-product materials which contain from 45 to about 75 weight percent lead in the form of lead compounds which are of the character of slag produced in a reverberatory lead recovery furnace, comprising the steps of
   (a) charging said lead by-product materials to a rotary furnace;
   (b) drying and melting the lead by-product materials at 330° to about 650° C. until any residual moisture is driven off;
   (c) adding to the molten furnace charge about 0.05 to about 0.25 pounds per pound of said charge of an active alkali metal mixture;
   (d) smelting the furnace charge in the presence of said alkali metal mixture for a time sufficient to form a separate metallic lead phase and a residue; and
   (e) removing the metallic lead from the furnace.

2. The process of claim 1 in which the lead by-product materials include solids from process water treatment facilities.

3. The process of claim 1 in which the rotary furnace is operated at a burner temperature of 900° to about 1100° C., as determined by stack gas temperature measurements, about 1 to about 2 revolutions per minute and over a complete cycle of about 4 hours.

4. The process of claim 1 in which said active alkali metal mixture is a mixture of an alkali metal, an alkaline earth metal and salts thereof.

5. The process of claim 1 in which the alkali metal of said active alkali metal mixture is sodium.

6. The process of claim 1 in which said active alkali metal mixture contains as the major components a mixture of sodium and calcium.

7. The process of claim 1 in which said active alkali metal mixture is solidified sodium filter sludge containing about 70 weight percent sodium and from 5 to about 30 weight percent calcium.

8. The process of claim 1 further characterized in that in said step (e) after removing said metallic lead from the furnace, the residue is removed in molds, cooled, leached to remove residual salts, and discarded.

* * * * *